US005779303A

United States Patent [19]
Kuelbs et al.

[11] Patent Number: 5,779,303
[45] Date of Patent: Jul. 14, 1998

[54] SUPPORT BRACKET SYSTEM FOR SECURING MOTORCYCLE BACKRESTS

[75] Inventors: Gregory G. Kuelbs; Michael J. Green. both of Fort Worth. Tex.

[73] Assignee: Chrome Specialties, Inc. Fort Worth, Tex.

[21] Appl. No.: 792,403

[22] Filed: Feb. 3, 1997

[51] Int. Cl.⁶ .................................................. B62J 1/28
[52] U.S. Cl. .............................. 297/215.11; 297/215.12; 280/202; 280/304.4
[58] Field of Search ................ 297/215.11, 215.12, 297/352, 440.15; 248/222.51; 403/353, 393; 280/202, 288.4, 304.3, 304.4, 304.5

[56] References Cited

U.S. PATENT DOCUMENTS

| | | | |
|---|---|---|---|
| D. 385,846 | 11/1997 | Gogan et al. | D12/407 |
| D. 386,131 | 11/1997 | Gogan et al. | D12/114 |
| D. 386,468 | 11/1997 | Gogan et al. | D12/407 |
| 2,556,839 | 6/1951 | Cretella | 403/353 |
| 3,791,563 | 2/1974 | Raat | 224/39 R |
| 3,850,353 | 11/1974 | Foulds | 224/31 |
| 4,030,750 | 6/1977 | Abram | 297/375 |
| 4,032,189 | 6/1977 | Benavente et al. | 297/352 |
| 4,045,834 | 9/1977 | Mason | 9/7 |
| 4,051,985 | 10/1977 | Berger | 224/32 |
| 4,111,448 | 9/1978 | Sklodowsky | 280/289 |
| 4,225,265 | 9/1980 | Hooker et al. | 248/222.51 X |
| 4,244,496 | 1/1981 | Litz | 224/32 |
| 4,466,660 | 8/1984 | Mabie | 297/195 |
| 4,470,716 | 9/1984 | Welch | 403/254 |
| 4,473,316 | 9/1984 | Welch | 403/246 |
| 4,570,998 | 2/1986 | Hughes | 297/215.12 X |
| 4,630,982 | 12/1986 | Fenner | 410/102 |
| 4,673,190 | 6/1987 | Ahlberg | 280/289 |
| 4,993,731 | 2/1991 | Fuller | 297/352 X |
| 5,141,385 | 8/1992 | Tibbatts et al. | 403/353 X |

*Primary Examiner*—Peter R. Brown
*Attorney, Agent, or Firm*—Melvin A. Hunn; Max Ciccarelli

[57] ABSTRACT

A support bracket system for securing a motorcycle backrest to a motorcycle fender rail. The support bracket system has left and right support members. Each support member has a substantially flat planar member with forward and rearward mounting members located in forward and rearward mounting portions. The forward coupling member has a bolt feed slot communicating with a locking cavity. At least one bolt member assists in securing the substantially flat planar members to the motorcycle. The bolt member has an elongated shaft, at least one externally threaded portion, and a shoulder. At least one internal threaded nut with a locking shoulder portion and a stem portion cooperate with the bolt to secure the support members. The shoulder portion of the bolt and the locking shoulder portion of the internal threaded nut engage the inward and outward surfaces of the substantially planar plates. The stem portion of the internal threaded nut is sized to fit within the locking cavity but not through the bolt feed slot. When the bolt and nut are threaded together, a positive lock is provided which secures the support member in position.

17 Claims, 8 Drawing Sheets

VIEW A-A

SUPPORT BRACKET SYSTEM FOR SECURING MOTORCYCLE BACKRESTS

BACKGROUND OF THE INVENTION

1. Field of the Invention

The present invention relates in general to motorcycle backrests and in particular to support bracket systems for motorcycle backrests.

2. Description of the Prior Art

A variety of motorcycle backrest mounting devices exist in the prior art. Most are relatively complex devices that may fail easily under repeated use, or which may be so difficult to operate that their use is discouraged.

SUMMARY OF THE INVENTION

It is one objective of the present invention to provide a support bracket system for use with motorcycle backrests which is securely and positively locked in position relative to the motorcycle to prevent accidental disconnection of the backrest system from the motorcycle, thus enhancing motorcycle safety.

It is another objective of the present invention to provide a backrest support system which requires a particular predefined complex series of assembly and disassembly steps, which cannot be performed out of order, in order to both enhance motorcycle safety and to deter the theft of motorcycle components such as the backrest and sissybar support, both of which may be secured to the motorcycle through the support backrest system of the present invention.

These and other objectives are attained as now described. A support bracket system is provided for securing a motorcycle backrest to a motorcycle fender rail. The motorcycle backrest typically has first and second substantially parallel fastening arms. The present invention includes a left support member and a right support member. The left support member and right support member are preferably mirror-image symmetrical. Each support member includes a substantially planar plate member. The plate member has an inward facing side and an outward facing side. An upper backrest receiving portion is secured to the inward-facing side of each substantially planar plate member. Each substantially planar plate member includes a forward mounting portion and a rearward mounting portion. A forward coupling member is located at the forward coupling portion of the substantially planar plate member. The forward coupling member includes a bolt feed slot and a locking cavity communicating with the bolt feed slot, wherein the bolt feed slot and the locking cavity are dimensioned to allow passage and retention of the motorcycle fender bolt. A rearward coupling member is located at the rearward mounting portion of the substantially planar plate member. The rearward coupling member includes a bolt feed slot and a locking cavity communicating with the bolt feed slot. The rearward coupling member may or may not have the locking cavity and bolt feed slot sized in a dimension which allows the passage of a motorcycle fender bolt. A bolt member is provided for securing the rearward coupling member of the substantially planar plate member in a fixed position relative to the motorcycle. The bolt member includes an elongated shaft, and at least one externally threaded portion. A shoulder is also provided on the elongated shaft. An internal threaded nut is also provided, which includes a locking shoulder portion and a stem portion. The locking shoulder portion of the internally threaded nut and the shoulder portion of the elongated shaft are utilized to engage the inward and outward surfaces of the substantially planar plate. A stem portion is provided which extends through the plate, which is adapted in size to be passed through the locking cavity but which cannot be passed through the bolt feed slot. When the bolt member and the nut member are threaded together, a positive lock is provided which secures the support member in position.

The above, as well as additional objects, features, and advantages of the invention, will become apparent in the following detailed description.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE INVENTION

Figure 1:
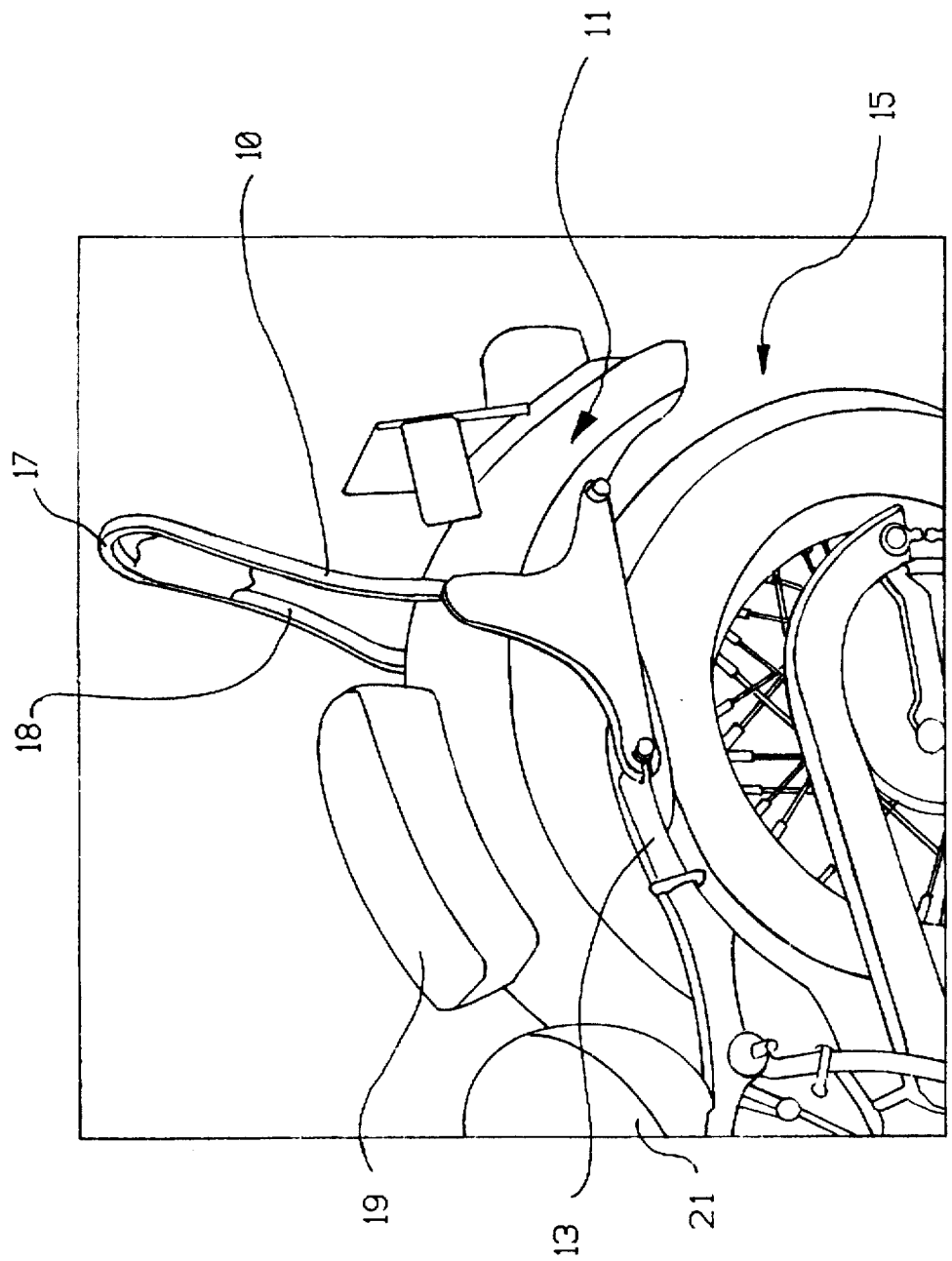
FIG. 1 is a pictorial representation of the improved support bracket system for a motorcycle backrest in accordance with the present invention as installed on a motorcycle.

FIG. 1 is a pictorial representation of the improved support bracket system for a motorcycle backrest in accordance with the present invention as installed on a motorcycle. As is shown, support bracket system 11 is secured to fender rail 13 of motorcycle 15. Support bracket system 11 is utilized to secure motorcycle backrest 17 in a fixed position relative to rearward seat 19 and forward seat 21. During use, the passenger may lean backward on motorcycle backrest 17 for support. Motorcycle backrest 17 enhances riding safety by preventing passengers on motorcycle 15 when it accelerates rapidly.

Figure 2:
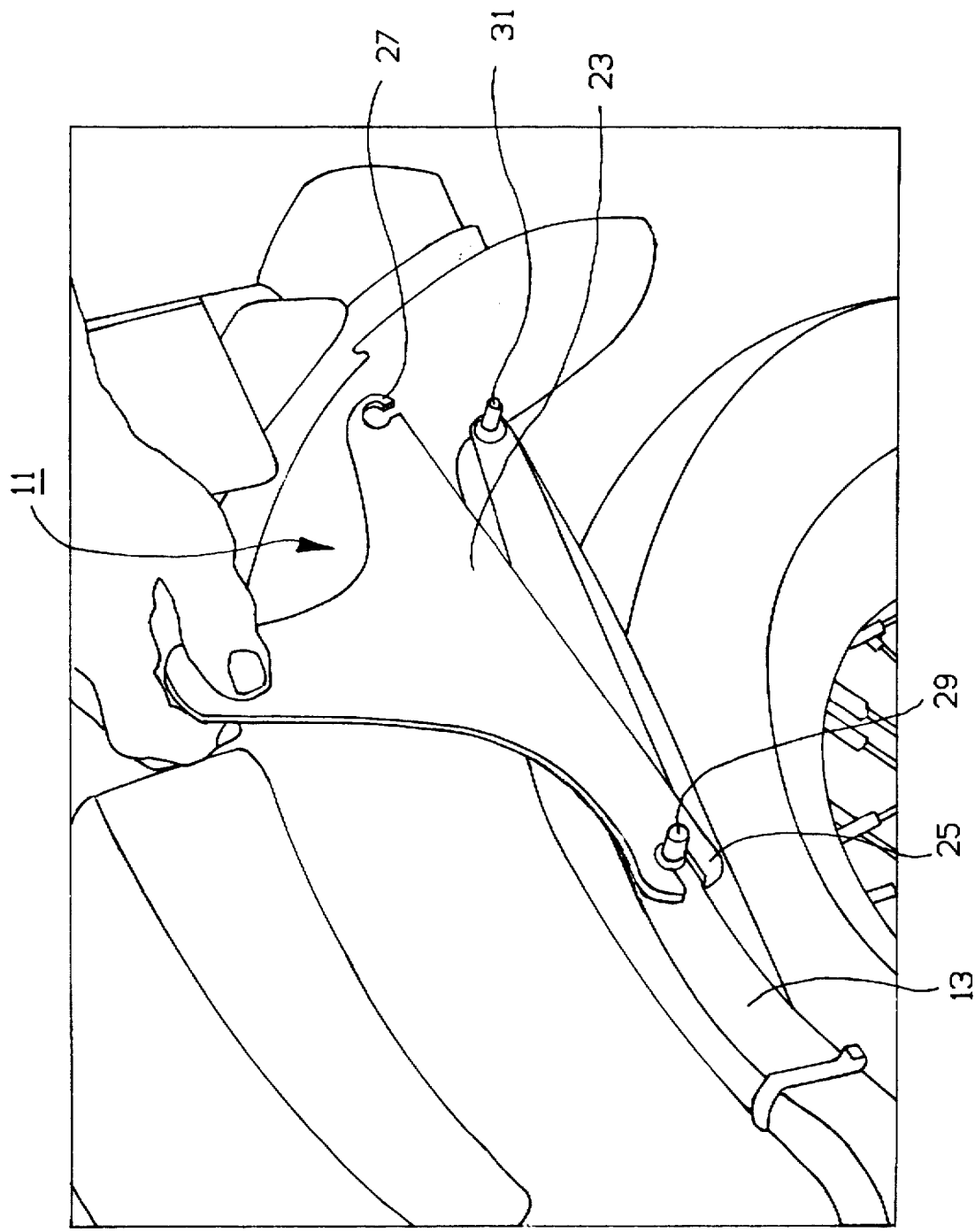
FIG. 2 is a pictorial representation of the improved support bracket for a motorcycle backrest during placement on a motorcycle.

FIG. 2 is a pictorial representation of the improved support bracket 11 for a motorcycle backrest during placement on motorcycle 15. As is shown, left support member 23 is secured in position on the left side of motorcycle 15. Preferably, a right support member (not depicted) is secured on the opposite side of motorcycle 15. As is shown, left support member 23 includes forward coupling member 25, which is adapted in size and shape to engage bolt member 29, which is secured in position relative to fender rail 13. Left support member 23 further includes rearward coupling member 27, which is adapted in size and shape to engage bolt member 31, which is likewise secured in position relative to fender rail 13. In the preferred embodiment of the present invention, forward coupling member is oriented into a position which allows it to slide over bolt member 29 by generally inward movement of left support member 23 relative to motorcycle 15. Also, in the preferred embodiment of the present invention, rearward coupling member 27 is oriented relative to left support member 23 in a manner which allows it to accept bolt member 31 when left support member 23 is moved generally downward relative to fender rail 13. Requiring a combination of forward and downward movement enhances the security of support bracket system 11, since forward coupling member 25 cannot disengage from bolt member 29 without the prior upward movement of rearward coupling member 27 relative to bolt member 31.

Figure 3:
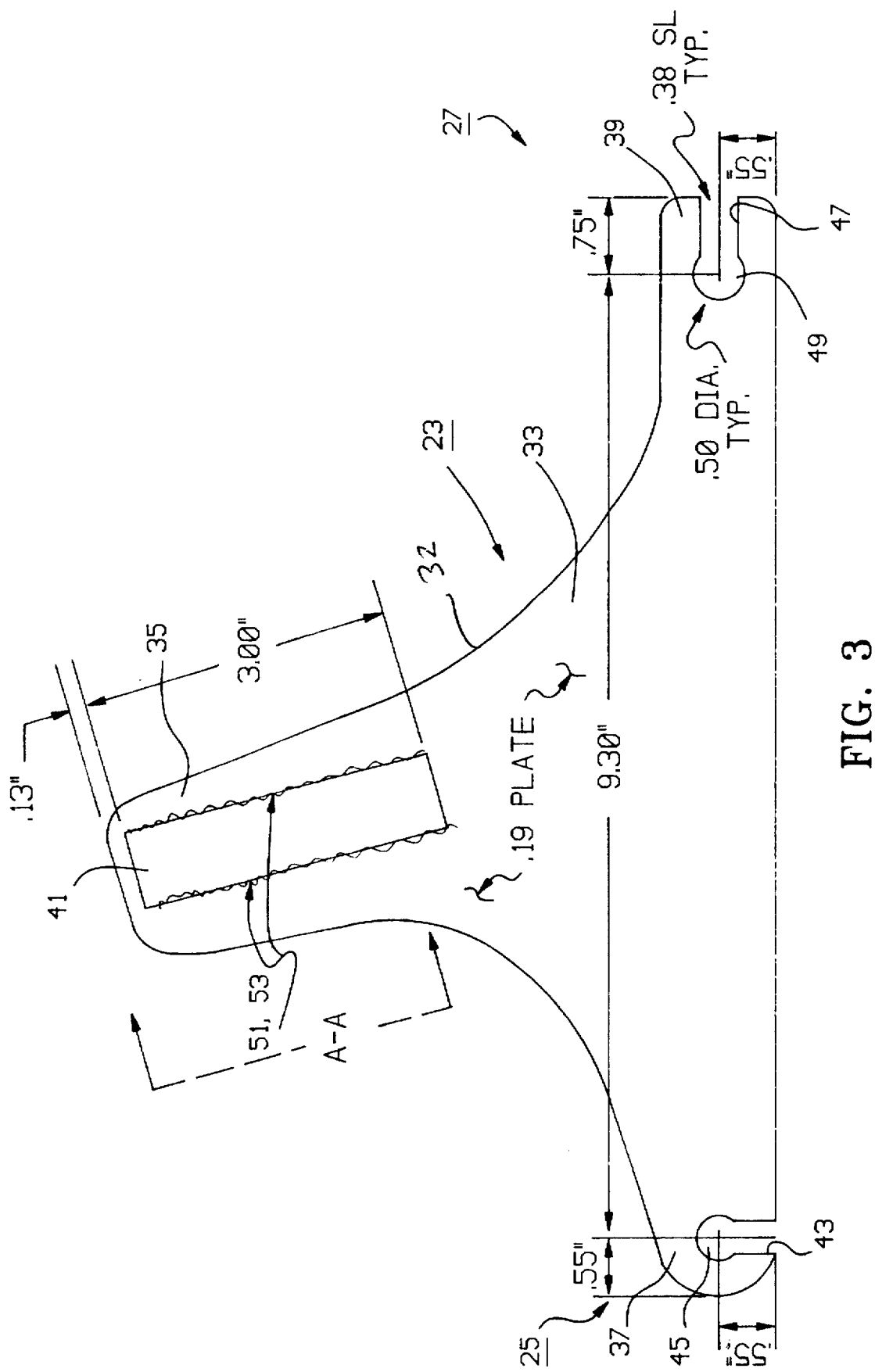
FIG. 3 is a top plan view of the inward facing side of an alternative support bracket system for motorcycle backrests of the present invention.

FIG. 3 is a top plan view of the inward facing side of the improved support bracket system for motorcycle backrests of the present invention which is depicted in FIGS. 1 and 2. As is shown, the left support member 23 includes a substantially planar plate member 32. The substantially planar plate member 32 has an inward facing side 33 (which is depicted in FIG. 3) and an outward facing side 30 (which is depicted in FIGS. 1 and 2). The substantially planar plate member 32 has an upper backrest receiving portion 35, a rearward mounting portion 37, and a forward mounting portion 39. A retainer member 41 is located at the upper backrest receiving portion 35 of the substantially planar plate 32. The retainer member 41 is adapted in shape and position for securing the first one of the first and second substantially planar parallel fastening arms 16, 18, of the motorcycle backrest 17. Preferably, retainer member 41 is secured to substantially planar plate member 32 by welds 51, 53.

Figure 5:
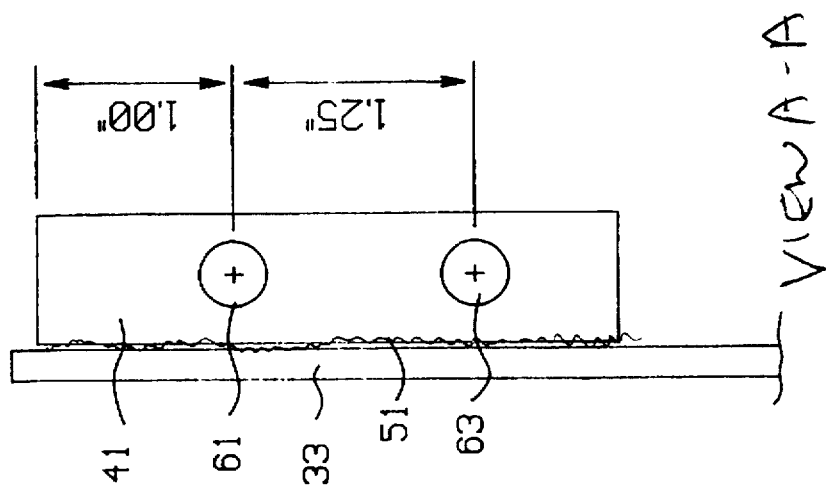
FIG. 5 is a partial longitudinal section view of the improved support bracket system for motorcycle backrests of FIG. 3 as seen along Section Line A—A.

FIG. 5 is a partial longitudinal section view of the improved support bracket system 11 for motorcycle backrests of FIG. 3 as seen along section line A—A, which more fully depicts the retainer member 41. As is shown, retainer member 41 is secured by weld 51 to inward facing side 33 of substantially planar plate member 32. Preferably, retainer member 41 is a rectangular-shaped tubing member which includes fastening ports 61, 63, which are drilled therethrough, and which are adapted to receive the fastening bolts (not depicted) which secure through ports provided in the first and second substantially parallel fastening arms 16, 18 (of FIG. 1). The preferred location for fastening ports 61, 63, is depicted in FIG. 5.

Returning now to FIG. 3, left support member 23 includes a rearward coupling member 25 and a forward coupling member 27. Rearward coupling member 25 is located at a rearward mounting portion 37 of substantially planar plate member 32. Rearward coupling member 25 includes a bolt feed slot 43 which faces downward. A locking cavity 45 communicates with bolt feed slot 43. In the preferred embodiment of the present invention, the bolt feed slot 43 and the locking cavity 43 are dimensioned to allow passage and retention of a motorcycle fender bolt 29. Preferably, bolt feed slot 43 has a width of 0.378 inches. Also, in the preferred embodiment of the present invention, locking cavity 45 has a diameter of 0.50 inches. As will be described in greater detail hereunder, specially shaped nuts are utilized to secure left support member 23 in position relative to motorcycle fender rail 13, and in particular the nut is provided with at least one shoulder portion which is adapted to extend into locking cavity 45, but which is too large in diameter to pass through bolt feed slot 43. Thus provides a positive locking mechanism which ensures that left support member 23 is anchored in position relative to the motorcycle fender rail 13 (of FIG. 1).

With continued reference to FIG. 3, left support member 23 is depicted as including forward coupling member 27 at the opposite distal end of substantially planar plate member 32. Forward coupling member 27 includes bolt feed slot 47 which opens from substantially planar plate member 32. Preferably, bolt feed slot 47 has a diameter of 0.38 inches. Bolt feed slot 47 communicates with locking cavity 49. Locking cavity 49 is semi-circular in shape and has a diameter of 0.50 inches. Both bolt feed slot 47 and locking cavity 39 are adapted in dimension to allow the passage of bolt member 31 therethrough. Bolt member 31 is adapted to mate with an especially provided nut member which includes a shoulder which is adapted in size to be accommodated within locking cavity 49, but which is too large in dimension to be passed outwardly through bolt feed slot 47. These features will be discussed in detail below.

Figure 4:
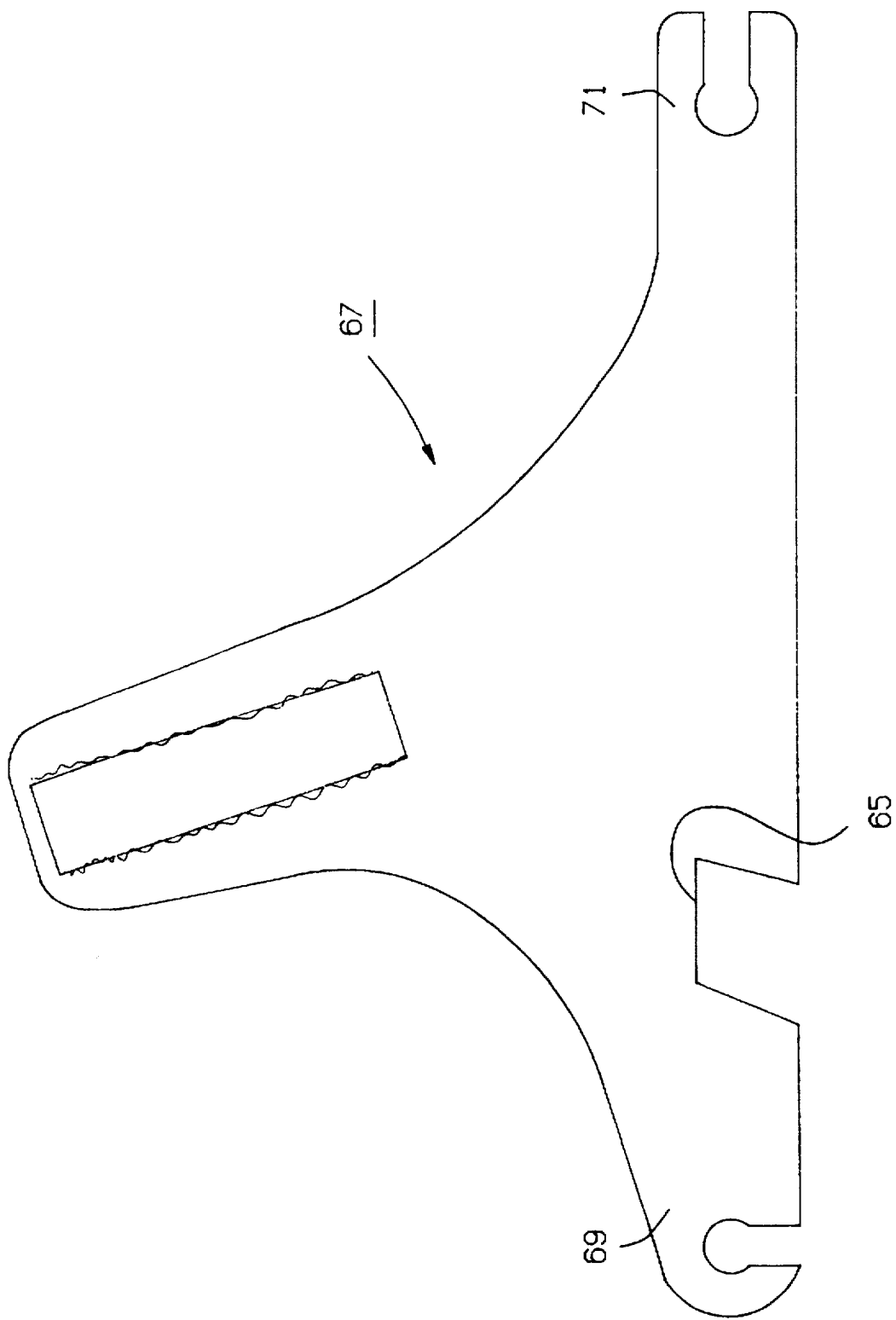
FIG. 4 is a top plan view of the inward facing side of an alternative support bracket system for motorcycle backrests in accordance with the present invention.

FIG. 4 is a top plan view of the inward facing side of an alternative support bracket system for motorcycle backrests in accordance with the present invention. In this particular alternative embodiment, a notched region 65 may be provided in the support member 67. The notched shape is provided in a position intermediate rearward coupling member 69 and forward coupling member 71, and adapted in size and shape to accommodate the placement of turn signal indicator lights, which may be independently mounted on the motorcycle fender rail.

Figure 6:
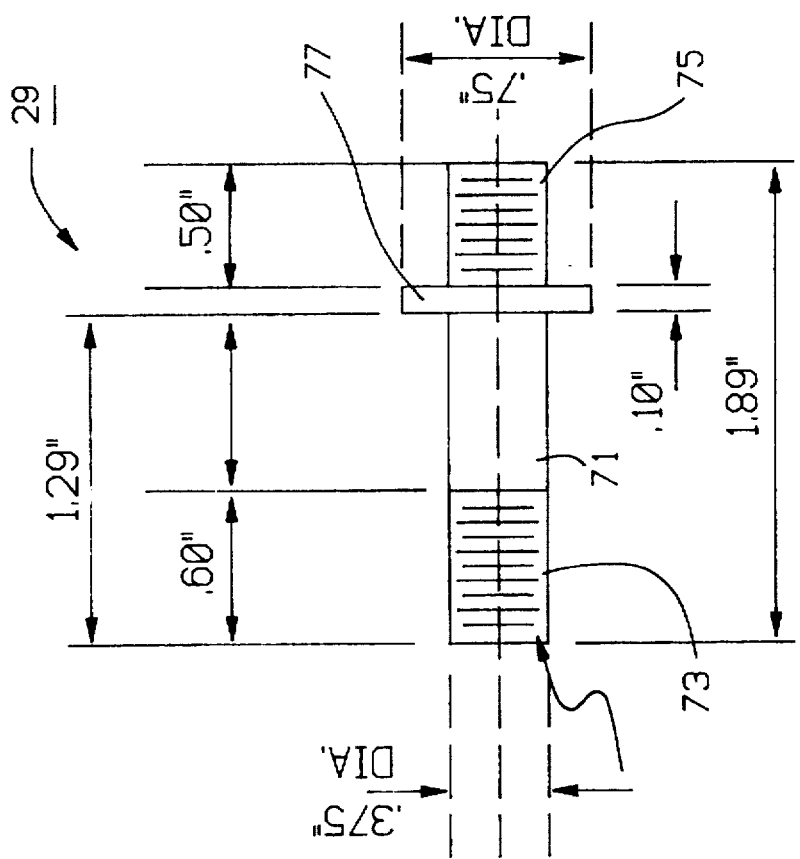
FIG. 6 is a simplified top plan view of a bolt utilized with the preferred embodiment of the improved support bracket system for motorcycle backrests of the present invention.
Figure 8:
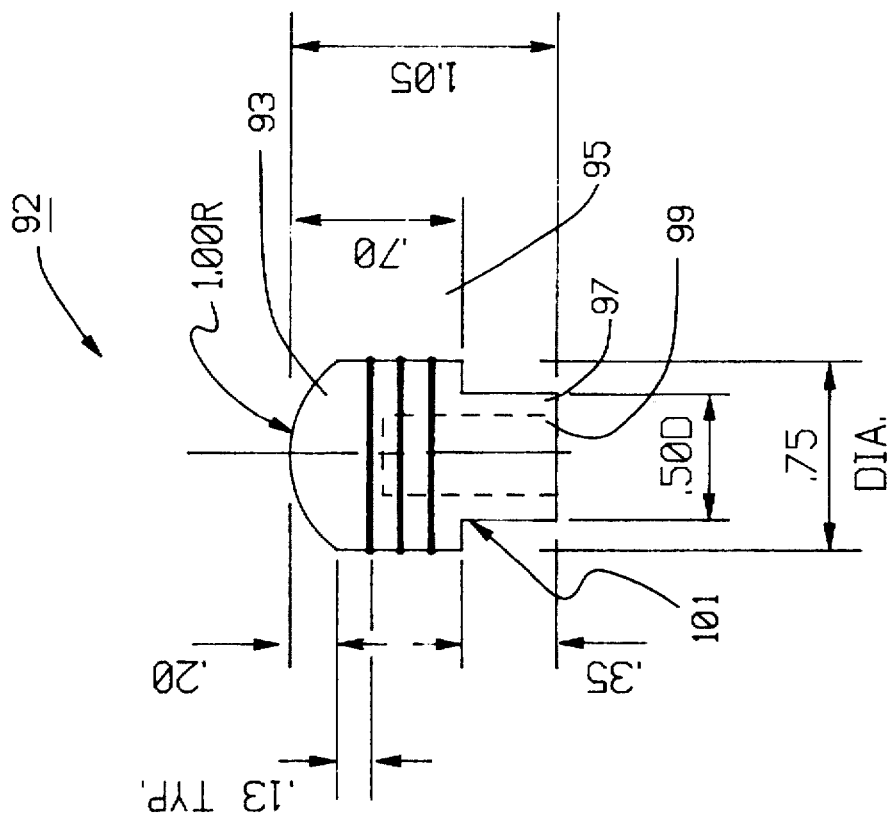
FIG. 8 is a simplified plan and partial phantom view of a second nut type which may be utilized with the preferred embodiment of the improved support bracket system for motorcycle backrests of the present invention.
Figure 7:
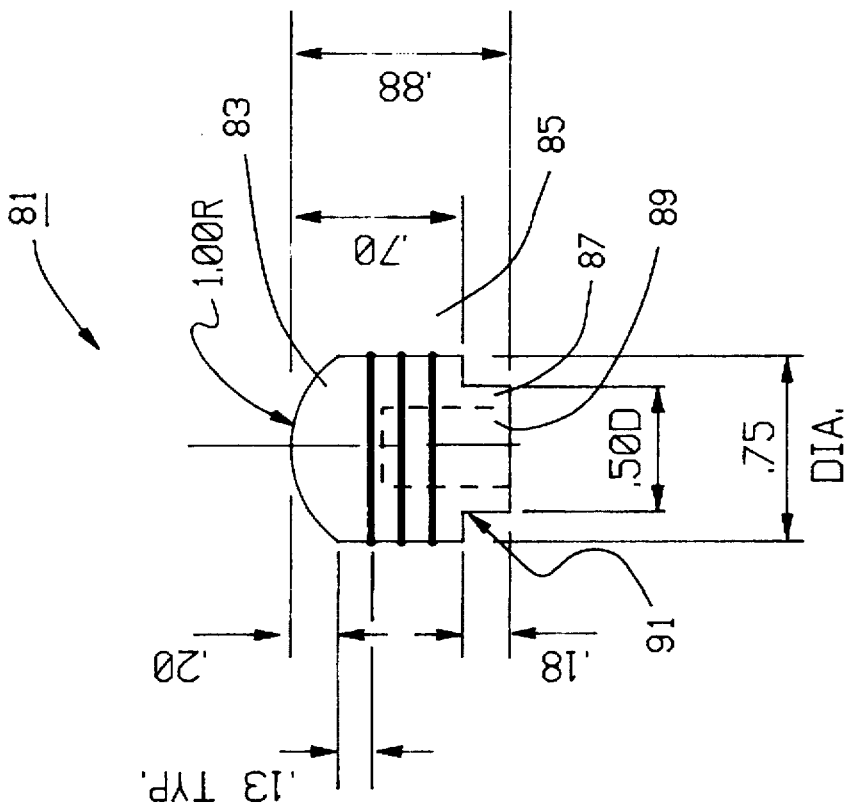
FIG. 7 is a simplified plan and partial phantom view of a first nut type which may be utilized with the preferred embodiment of the improved support bracket system for motorcycle backrests of the present invention.

FIGS. 6, 7, and 8 depict one type of bolt member which may be utilized to secure the support bracket system in a fixed position relative to the motorcycle fender rail 13 (of FIG. 1) and two types of nuts which may be utilized in combination with the bolt member to positively lock the left and right support members to the left and right motorcycle fender rails 13 of motorcycle 15.

FIG. 6 is a simplified top plan view of a bolt utilized with the preferred embodiment of the improved support bracket system 11 for motorcycle backrests of the present invention. As is shown, bolt member 29 is utilized in securing the rearward coupling member 25 of the substantially planar plate member 32 in a fixed position relative to motorcycle 15. Bolt member 29 includes an elongated shaft 71. Preferably, elongated shaft 71 includes at least one externally threaded portion 73, 75, and at least one shoulder portion 77. In the particular embodiment depicted in FIG. 6, the shoulder 77 and externally threaded portion 75 are utilized to secure bolt member 29 in a fixed position relative to motorcycle fender rail 13 (of FIG. 1). A conventional nut is utilized to engage externally threaded portion 75. Preferably, shaft 71 and externally threaded portion 73 are passed through the bolt feed slot 43 and locking cavity 45 of forward mounting portion 37. Since the diameter of externally threaded portion 73 is 0.375 inches, it will pass easily through both bolt feed slot 43 and locking cavity 45.

FIG. 7 is a simplified plan and partial phantom view of internally threaded nut 81, which may be utilized with the preferred embodiment of the improved support bracket system 11 for motorcycle backrests of the present invention. As is shown, internally threaded nut includes the head 83, which may include decorative components 85 (such as grooves with elastomeric O-rings contained therein which provide an attractive appearance). Internally threaded nut 81 further includes a stem portion 87, which has a diameter less than head portion 83. Preferably, the diameter of stem portion 87 is sufficiently small to pass through the locking cavity 45 of rearward coupling member 25, but which is dimensioned too large to pass through bolt feed slot 43. As is shown in FIG. 7, stem portion 87 has a diameter of 0.50 inches, while head portion 83 has a diameter of 0.75 inches. Stem portion 87 includes an internally threaded cavity 89 which extends into head portion 83. Stem portion 87 and head portion 83 together define a locking shoulder 91. In use, internally threaded cavity 89 engages the externally threaded portion 75 of bolt member 29 of FIG. 6. In use, shoulder portion 77 is adapted to engage the inward facing side of substantially planar plate member 32, while head portion 83 is adapted to engage the outward facing side 30 of substantially planar plate member 32. Stem portion 87 extends through locking cavity 45 of rearward coupling member 25, and is too large to pass through bolt feed slot 43 of rearward coupling member 25. In this manner, the substantially planar plate member 32 is positively locked in position relative to motorcycle fender rail 13.

FIG. 8 is a simplified plan and partial phantom view of a second nut type which may be utilized with the preferred embodiment of the improved support bracket system for motorcycle backrests of the present invention. The internally threaded nut 92 depicted in FIG. 8 is substantially similar to the internally threaded nut 91 of FIG. 7 with one difference. As is shown, internally threaded nut included the head 93, which may include decorative components 95 (such as grooves with elastomeric O-rings contained therein which provide an attractive appearance). Internally threaded nut 92 further includes a stem portion 97, which has a diameter less than head portion 93. Preferably, the diameter of stem portion 97 is sufficiently small to pass through the locking cavity 45 of rearward coupling member 25, but which is dimensioned too large to pass through bolt feed slot 43. As is shown in FIG. 8, stem portion 97 has a diameter of 0.50 inches, while head portion 93 has a diameter of 0.75 inches. Stem portion 97 includes an internally threaded cavity 99 which extends into head portion 93. Stem portion 97 and head portion 93 together defined a locking shoulder 101. In use, internally threaded cavity 99 engages the externally threaded portion 75 of bolt member 29 of FIG. 6. In use, shoulder portion 77 is adapted to engage the inward facing side of substantially planar plate member 32, while head portion 93 is adapted to engage the outward facing side 30 of substantially planar plate member 32. Stem portion 97 extends through locking cavity 45 of forward coupling member 25, and is too large to pass through bolt feed slot 43 of rearward coupling member 25. In this manner, the substantially planar plate member 32 is positively locked in position relative to motorcycle fender rail 13. The difference between the internally threaded nut of FIG. 7 and the internally threaded nut of FIG. 8 is that stem portion 97 has a slightly greater length than stem portion 87 of internally threaded nut 81 of FIG. 7. This allows the internally threaded nut 92 of FIG. 8 to be utilized also as a means for supporting saddlebag supports, such as that depicted in FIGS. 9 and 10.

Figure 9:
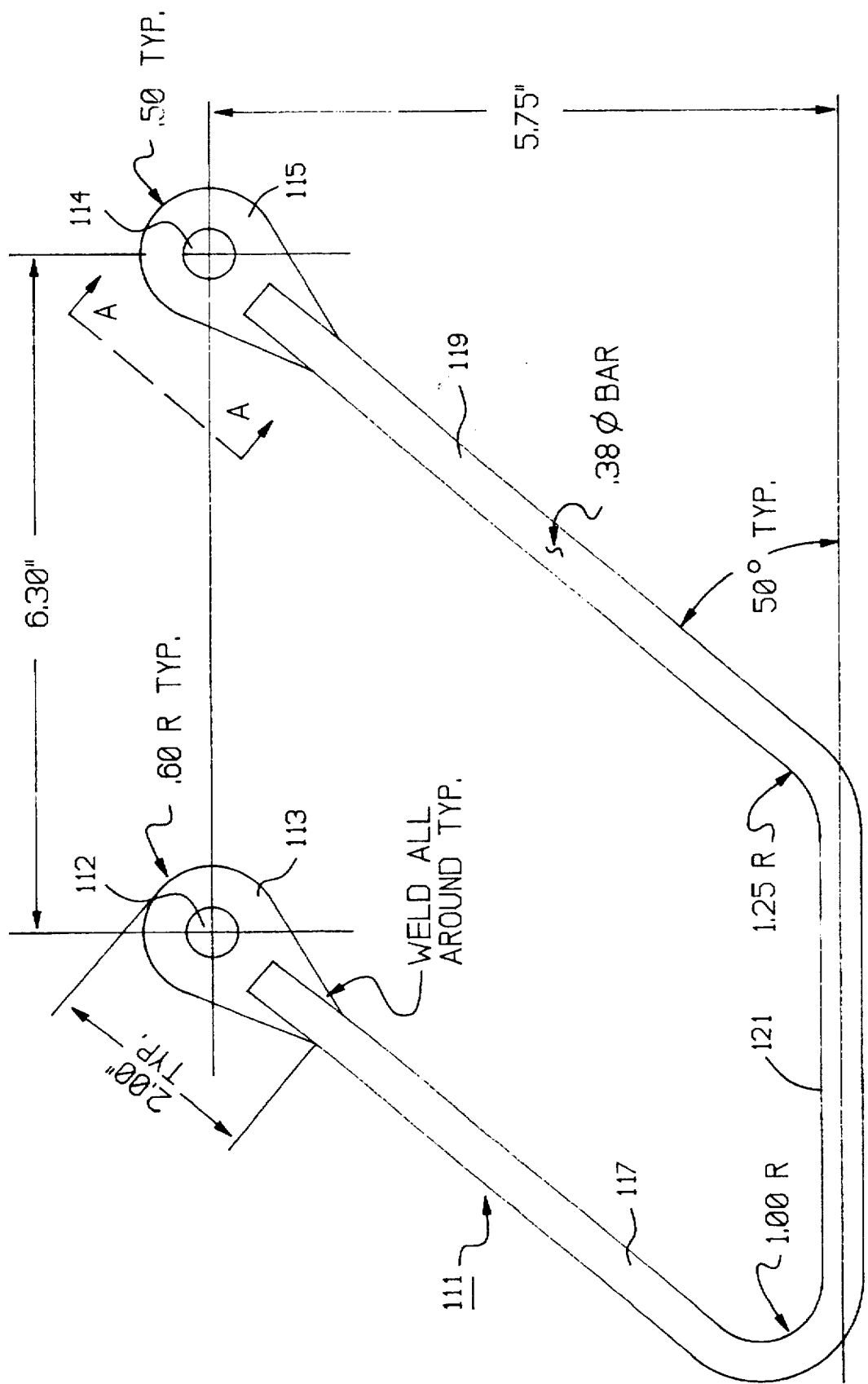
FIG. 9 is a simplified perspective view of a saddlebag support member which may be utilized in combination with the improved support bracket system for motorcycle backrests of the present invention.

FIG. 9 is a simplified perspective view of a saddlebag support member 111 which may be utilized in combination with the improved support bracket system 11 for motorcycle backrests of the present invention. As is shown, saddlebag support member 111 includes connector ends 113, 115, each of which include a cavity 112, 114, which is adapted in diameter (preferably, 0.50 inch diameter hole) which may receive the stem portion 87 of the internally threaded nut 92 of FIG. 8. Connector ends 113, 115, are welded to downwardly extending rails 117, 119, which are integrally formed with bottom support 121. In use, motorcycle saddlebags extend over the seat of the motorcycle and are supported by saddlebag support 111 and prevented from becoming entangled in the motorcycle wheel and chain, or other drive system.

Figure 10:
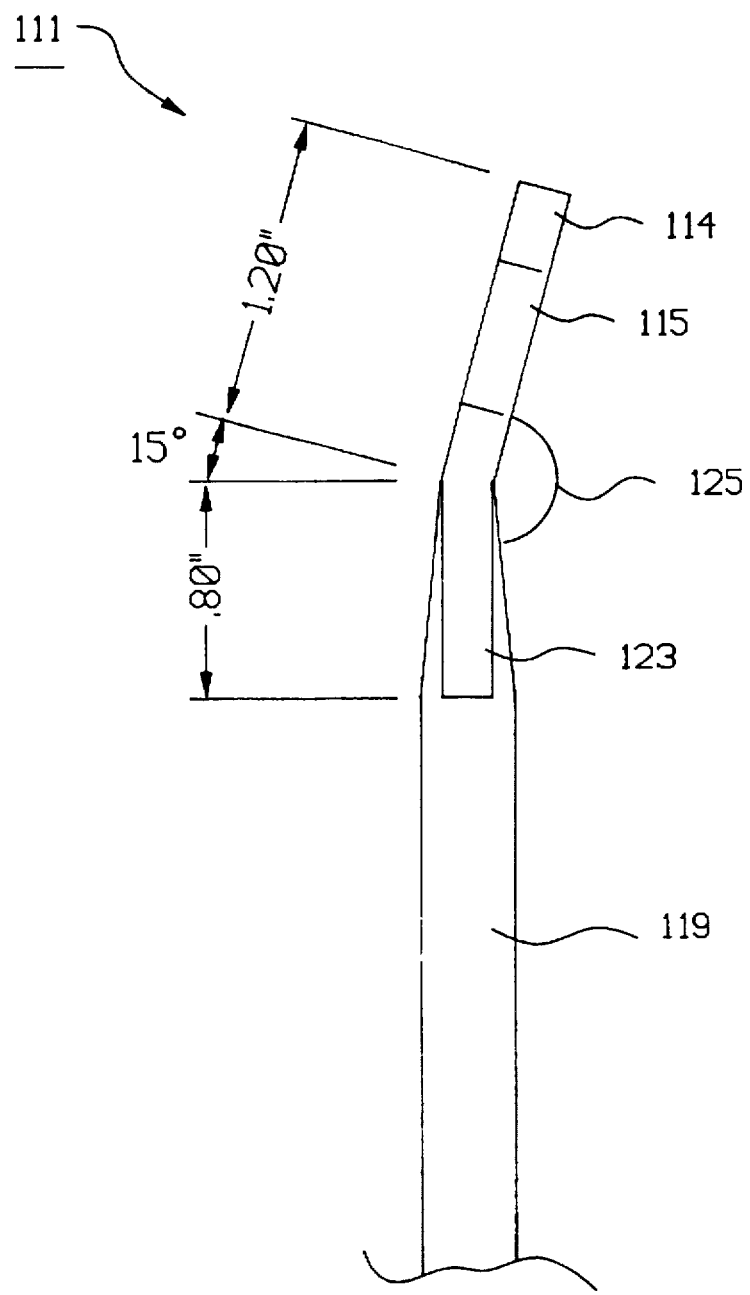
FIG. 10 is a partial longitudinal section view of the saddlebag support member of FIG. 9 as seen along section line A—A.

FIG. 10 is a partial longitudinal section view of the saddlebag support member 111 of FIG. 9 as seen along section line A—A. As is shown, connection end 114 is secured in position relative to downwardly extending rail 119 by weld 123. As is shown, connector 114 is maintained at an angle 125 relative to downwardly extending rail 119. This ensures that the rails 117, 119, 121 hold the bag out at a predefined angle relative to the motorcycle.

Support bracket system 11 of the present invention is superior to prior art support bracket systems insofar as the left and right support members may be positively locked into position relative to the motorcycle. This prevents accidental disconnection of the support members from the motorcycle, and also serves to deter the theft of motorcycle components such as the sissybar and saddlebag support, since the support system is not responsive to pulling, and may require more time for disassembly than the prior art devices.

Although the invention has been described with reference to a specific embodiment, this description is not meant to be construed in a limiting sense. Various modifications of the disclosed embodiment as well as alterative embodiments of the invention will become apparent to the persons skilled in the art upon reference to the description of the invention. It is therefore contemplated that the appended claims will cover any such modifications or embodiments that fall within the true scope of the invention.

What is claimed is:

1. A support bracket system for use in securing a motorcycle backrest, having a backrest member and first and second substantially parallel fastening arms, to a fender rail of a motorcycle, comprising:
   (1) left and right support members each including:
      (a) a substantially planar plate member having:
         (1) an inward facing side;
         (2) an outward facing side;
         (3) an upper backrest receiving portion;
         (4) a forward mounting portion; and
         (5) a rearward mounting portion;
      (b) a retainer member located at said upper backrest receiving portion of said substantially planar plate member, and adapted for securing one of said first and second substantially parallel fastening arms of said motorcycle backrest;
      (c) a forward coupling member located at said forward mounting portion of said substantially planar plate member, said forward coupling member including:
         (1) a bolt feed slot;
         (2) a locking cavity communicating with said bolt feed slot;
         (3) said bolt feed slot and said locking cavity being dimensioned to allow passage and retention of a motorcycle fender bolt;

(d) a rearward coupling member located at said rearward mounting portion of said substantially planar plate member, said rearward coupling member including:
   (1) a bolt feed slot;
   (2) a locking cavity communicating with said bolt feed slot;

(2) at least one forward bolt member adapted to extend through at least one of said locking cavities of said forward coupling members to secure at least one of said forward coupling members of said substantially planar plate members in a fixed position relative to said motorcycle;

(3) at least one rear bolt member for securing at least one of said rearward coupling members of said substantially planar plate members in a fixed position relative to said motorcycle, said at least one rear bolt member including:
   (a) an elongated shaft;
   (b) at least one externally threaded portion of said elongated shaft;
   (c) at least one shoulder portion on said elongated shaft, said at least one shoulder portion mating with the substantially planar plate member;

(4) at least one internally threaded nut for threaded connection to said at least one rear bolt member, said at least one internally threaded nut including:
   (a) a locking shoulder portion which mates with the substantially planar pate member and retains it against said at least one shoulder portion on said elongated shaft;
   (b) a stem portion having an outer diameter smaller than an inner diameter of the locking cavity;
   (c) wherein the internally threaded nut can be secured onto said at least one rear bolt member so that the stem portion of said at least one internally threaded nut is located within the locking cavity.

2. A support bracket according to claim 1, wherein:
said stem portion of said internally threaded nut has a diameter sufficient for locking engagement with said locking cavity of said rearward coupling member.

3. A support bracket according to claim 2, wherein:
said locking cavity of said rearward coupling member has a diameter sufficient to allow passage of said stem portion of said internally threaded nut; and
wherein said bolt feed slot of said rearward coupling member is smaller in diameter than said stem portion of said internally threaded nut to prevent passage therethrough.

4. A support bracket according to claim 1, wherein:
said stem portion of said internally threaded nut has a preselected length and a preselected diameter sufficient to allow coupling of a saddlebag support bracket between said shoulder portion of said internally threaded nut and said rearward mounting portion of said substantially planar plate member.

5. A support bracket according to claim 1, wherein said rearward coupling member defines a keyhole slot for positive engagement of said internally threaded nut.

6. A support bracket according to claim 1, wherein said bolt feed slot of said rearward coupling member faces substantially downward.

7. A support bracket according to claim 1, wherein said bolt feed slot of said forward coupling member faces substantially forward.

8. A support bracket according to claim 1, wherein:
said bolt feed slot of said rearward coupling member faces substantially downward; and
said bolt feed slot of said forward coupling member faces substantially forward.

9. A support bracket system for use with a motorcycle backrest having a backrest member and first and second substantially parallel fastening arms, comprising:

(1) left and right support members each including:
   (a) a substantially planar plate member having:
      (1) an inward facing side;
      (2) an outward facing side;
      (3) an upper backrest receiving portion;
      (4) a forward mounting portion; and
      (5) a rearward mounting portion;
   (b) a backrest retainer member coupled to said inward facing side of said substantially planar plate member proximate said upper backrest receiving portion of said substantially planar plate member, defining a cavity adapted in size to accommodate passage of one of said first and second substantially parallel fastening arms of said motorcycle backrest;
   (c) a forward coupling member defined within said forward mounting portion of said substantially planar plate member, said forward coupling member including:
      (1) a bolt feed slot;
      (2) a semicircular cavity communicating with said bolt feed slot, said semicircular cavity having a diameter larger than a width of said bolt feed slot;
      (3) said bolt feed slot and said semicircular cavity being dimensioned to allow passage of a bolt member;
   (d) a rearward coupling member defined within said rearward mounting portion of said substantially planar plate member, said rearward coupling member including:
      (1) a bolt feed slot;
      (2) a semicircular cavity communicating with said bolt feed slot;

(2) at least one forward bolt member adapted to extend through at least one of said semicircular cavities of said forward coupling members to secure at least one of said forward coupling members of said substantially planar plate members in a fixed position relative to a motorcycle;

(3) at least one rear bolt member for securing at least one of said rearward coupling members of said substantially planar plate members in a fixed position relative to at least one motorcycle fender rail, the at least one rear bolt member including:
   (1) an elongated shaft;
   (2) at least one externally threaded portion of said elongated shaft;
   (3) at least one shoulder portion located proximate said externally threaded portion of said elongated shaft, said at least one shoulder portion operating to engage said substantially planar plate member;

(4) at least one internally threaded stud cap, including:
   (a) a locking shoulder portion which mates with the substantially planar pate member and retains it against said at least one shoulder portion on said elongated shaft;
   (b) a stem portion having a stem portion diameter;
   (c) wherein the internally threaded nut can be secured onto said at least one rear bolt member so that the stem portion of said at least one internally threaded stud cap is located within the locking cavity.

10. A support bracket system according to claim 9, wherein:

said stem portion of said internally threaded stud cap has a diameter sufficient for locking engagement with said semicircular cavity of said rearward coupling member.

11. A support bracket according to claim 10, wherein:

said semicircular cavity of said rearward coupling member has a diameter sufficient to allow passage of said stem portion of said internally threaded stud cap; and wherein said bolt feed slot of said rearward coupling member is smaller in width than said stem portion diameter of said internally threaded stud cap to prevent passage therethrough.

12. A support bracket according to claim 9, wherein:

said stem portion of said internally threaded stud cap has a preselected length and a preselected diameter sufficient to allow coupling of a saddlebag support bracket between said shoulder portion of said internally threaded stud cap and said rearward mounting portion of said substantially planar plate member.

13. A support bracket system according to claim 9, wherein said rearward coupling member defines a keyhole slot for positive engagement of said internally threaded stud cap.

14. A support bracket system according to claim 9 wherein said bolt feed slot of said rearward coupling member faces substantially downward.

15. A support bracket system according to claim 9 wherein said bolt feed slot of said forward coupling member faces substantially forward.

16. A support bracket system according to claim 9 wherein:

said bolt feed slot of said rearward coupling member faces substantially downward; and said bolt feed slot of said forward coupling member faces substantially forward.

17. A support bracket system for use in securing a motorcycle backrest to a fender rail of a motorcycle, comprising:

(1) left and right support members each including:
  (a) a substantially planar plate member having:
    (1) an inward facing side;
    (2) an outward facing side;
    (3) an upper backrest receiving portion;
    (4) a forward mounting portion; and
    (5) a rearward mounting portion;
  (b) a retainer member located at said upper backrest receiving portion of said substantially planar plate member, and adapted for securing one of said first and second substantially parallel fastening arms of said motorcycle backrest;
  (c) a forward coupling member located at said forward mounting portion of said substantially planar plate member, said forward coupling member having a locking cavity;
  (d) a rearward coupling member located at said rearward mounting portion of said substantially planar plate member, said rearward coupling member including:
    (1) a bolt feed slot;
    (2) a locking cavity communicating with said bolt feed slot;

(2) at least one forward bolt member extending through the locking cavity of at least one of said forward coupling members for securing said forward coupling member in a fixed position relative to said motorcycle;

(3) at least one rear bolt member for securing at least one of said rearward coupling members of said substantially planar plate members in a fixed position relative to said motorcycle, said at least one rear bolt member including:
  (a) an elongated shaft;
  (b) at least one externally threaded portion of said elongated shaft;
  (c) at least one shoulder portion on said elongated shaft, said at least one shoulder portion mating with the substantially planar plate member;

(4) at least one internally threaded nut for threaded connection to said at least one rear bolt member, said at least one internally threaded nut including:
  (a) a locking shoulder portion which mates with the substantially planar pate member and retains it against said at least one shoulder portion on said elongated shaft;
  (b) a stem portion having an outer diameter smaller than an inner diameter of the locking cavity;
  (c) wherein the internally threaded nut can be secured onto said at least one rear bolt member so that the stem portion of said at least one internally threaded nut is located within the locking cavity.

\* \* \* \* \*